(12) United States Patent
Chandan et al.

(10) Patent No.: US 10,401,044 B2
(45) Date of Patent: Sep. 3, 2019

(54) THERMAL MANAGEMENT OF BUILDINGS USING INTELLIGENT AND AUTONOMOUS SET-POINT ADJUSTMENTS

(71) Applicant: Utopus Insights, Inc., Valhalla, NY (US)

(72) Inventors: Vikas Chandan, Bangalore (IN); Zainul Charbiwala, Bangalore (IN); Rohit Chintala, Bangalore (IN); Sunil Kumar Ghai, Bangalore (IN)

(73) Assignee: Utopus Insights, Inc., Valhalla, NY (US)

( * ) Notice: Subject to any disclaimer, the term of this patent is extended or adjusted under 35 U.S.C. 154(b) by 460 days.

(21) Appl. No.: 14/793,066

(22) Filed: Jul. 7, 2015

(65) Prior Publication Data

US 2017/0010013 A1 Jan. 12, 2017

(51) Int. Cl.
*F24F 11/30* (2018.01)
*G05B 15/02* (2006.01)
*F24F 11/62* (2018.01)

(52) U.S. Cl.
CPC .............. *F24F 11/30* (2018.01); *F24F 11/62* (2018.01); *G05B 15/02* (2013.01); *G05B 2219/2642* (2013.01)

(58) Field of Classification Search
CPC .......... F24F 11/006; F24F 11/30; F24F 11/62; G05B 15/02; G05B 2219/2642
See application file for complete search history.

(56) References Cited

U.S. PATENT DOCUMENTS 4,633,937 A * 1/1987 Zilbermann .......... F24F 3/0442
165/217
5,506,768 A 4/1996 Seem et al.
(Continued)

FOREIGN PATENT DOCUMENTS

EP 2411741 A1 2/2012
WO 2014045163 A2 3/2014
(Continued)

OTHER PUBLICATIONS

Big Ladder Software, "Engineering Reference—EnergyPlus 8.4", copyright 2015 (accessed from <<https://bigladdersoftware.com/epx/docs/8-4/engineering-reference/air-system-compound-component-groups.html>> on Sep. 11, 2018) (Year: 2015).*

(Continued)

*Primary Examiner* — Kenneth M Lo
*Assistant Examiner* — Michael J Huntley
(74) *Attorney, Agent, or Firm* — Ahmann Kloke LLP

(57) ABSTRACT

Methods, systems, and computer program products for thermal management of buildings using intelligent and autonomous set-point adjustments are provided herein. A method includes capturing a user-selected setting that represents a desired balance between (i) energy usage and (ii) thermal comfort associated with a building; capturing, via a communication link with one or more hardware devices associated with thermal management of the building, one or more items of real-time information pertaining to the thermal management of the building; determining one or more set-point temperatures for the building based on (i) the user-selected setting, (ii) the items of real-time information pertaining to the thermal management of the building, and (iii) one or more constraints; and outputting the set-point temperatures to the hardware devices associated with the thermal management of the building for execution of a thermal management schedule to be carried out in accordance with the set-point temperatures.

16 Claims, 4 Drawing Sheets

(56) References Cited

U.S. PATENT DOCUMENTS

| | | | |
|---|---|---|---|
| 5,579,993 | A | 12/1996 | Ahmed et al. |
| 6,402,043 | B1 | 6/2002 | Cockerill |
| 8,010,237 | B2 | 8/2011 | Cheung et al. |
| 8,560,126 | B2 | 10/2013 | Vass et al. |
| 8,700,444 | B2 | 4/2014 | Singh |
| 8,843,239 | B2 | 9/2014 | Mighdoll et al. |
| 2011/0046805 | A1* | 2/2011 | Bedros ............... H04L 12/2809 700/291 |
| 2012/0245738 | A1 | 9/2012 | Allen-Ware et al. |
| 2013/0151013 | A1 | 6/2013 | Nikovski et al. |
| 2013/0204439 | A1* | 8/2013 | Scelzi ................. G06Q 10/00 700/276 |
| 2013/0291395 | A1* | 11/2013 | Doh .................... F26B 21/086 34/468 |
| 2014/0067132 | A1 | 3/2014 | Macek et al. |
| 2014/0129197 | A1* | 5/2014 | Sons .................. G06F 17/5004 703/7 |
| 2014/0156088 | A1 | 6/2014 | Li et al. |
| 2014/0236373 | A1 | 8/2014 | Lee |
| 2014/0379156 | A1* | 12/2014 | Kamel .................... G05F 1/66 700/291 |
| 2015/0021005 | A1* | 1/2015 | Land, III ............ F24F 11/0012 165/214 |
| 2015/0184882 | A1* | 7/2015 | Lin ....................... F24F 11/006 700/276 |
| 2015/0276508 | A1* | 10/2015 | Smullin .................. G01H 1/00 702/130 |
| 2015/0330923 | A1* | 11/2015 | Smullin ................. G01N 25/20 702/136 |
| 2016/0305678 | A1* | 10/2016 | Pavlovski ............ F24F 11/006 |

FOREIGN PATENT DOCUMENTS

| | | |
|---|---|---|
| WO | 2014059123 A1 | 4/2014 |
| WO | 2014153552 A1 | 9/2014 |

OTHER PUBLICATIONS

Nest, Meet the Nest Thermostat, accessed Jul. 7, 2015, https://nest.com/thermostat/life-with-nest-thermostat/ pp. 1-7.

* cited by examiner

THERMAL MANAGEMENT OF BUILDINGS USING INTELLIGENT AND AUTONOMOUS SET-POINT ADJUSTMENTS

FIELD

The present application generally relates to information technology, and, more particularly, to thermal management techniques.

BACKGROUND

Buildings, commercial and otherwise, are major consumers of energy. Additionally, thermal management commonly accounts for a significant amount of energy consumed in buildings. For instance, a primary objective of building air-conditioning is to provide thermal comfort to occupants. The set-point temperature in a given section of a building specifies a "target" indoor temperature to achieve. In many buildings, a building and/or facility manager manually chooses a set-point temperature value. In residential buildings, residents commonly manually choose set-points based on cooling and heating needs. An improper choice of set-points can result in energy efficiency and/or comfort issues.

SUMMARY

In one aspect of the present invention, techniques for thermal management of buildings using intelligent and autonomous set-point adjustments are provided. An exemplary computer-implemented method can include steps of capturing a user-selected setting that represents a desired balance between (i) energy usage and (ii) thermal comfort associated with a building; capturing, via a communication link with one or more hardware devices associated with thermal management of the building, one or more items of real-time information pertaining to the thermal management of the building; determining one or more set-point temperatures for the building based on (i) the user-selected setting, (ii) the one or more items of real-time information pertaining to the thermal management of the building, and (iii) one or more constraints; and outputting the one or more set-point temperatures to the one or more hardware devices associated with the thermal management of the building for execution of a thermal management schedule to be carried out in accordance with the one or more set-point temperatures.

In another aspect of the invention, an exemplary computer-implemented method can include steps of capturing a user-selected setting that represents a desired balance between (i) energy usage and (ii) thermal comfort associated with a building, and capturing, via a communication link with one or more hardware devices associated with thermal management of the building, one or more items of real-time information pertaining to the thermal management of the building comprising at least real-time occupancy data associated with the building. Such a method also includes determining one or more set-point temperatures for the building based on (i) the user-selected setting, (ii) the one or more items of real-time information pertaining to the thermal management of the building, and (iii) one or more constraints, and outputting the one or more set-point temperatures to the one or more hardware devices associated with the thermal management of the building for execution of a thermal management schedule to be carried out in accordance with the one or more set-point temperatures. Additionally, such a method includes detecting a change to the real-time occupancy data associated with the building, updating the one or more set-point temperatures for the building based on the detected change to the real-time occupancy data, and outputting the updated one or more set-point temperatures to the one or more hardware devices associated with the thermal management of the building for execution of a thermal management schedule to be carried out in accordance with the updated one or more set-point temperatures.

Another aspect of the invention or elements thereof can be implemented in the form of an article of manufacture tangibly embodying computer readable instructions which, when implemented, cause a computer to carry out a plurality of method steps, as described herein. Furthermore, another aspect of the invention or elements thereof can be implemented in the form of an apparatus including a memory and at least one processor that is coupled to the memory and configured to perform noted method steps. Yet further, another aspect of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

As described herein, an aspect of the present invention includes techniques for using real-time occupancy information for pro-active thermal management in buildings. At least one embodiment of the invention includes facilitating a user to manage energy consumption by selecting appropriate requirements for energy savings and thermal comfort, enabling dynamic (and continuous) determination and/or optimization of a set-point temperature based, for example, on building code(s) and utilization of real-time information such as contribution of occupancy to thermal load, real-time occupancy information, ambient temperature, etc.

Figure 1:
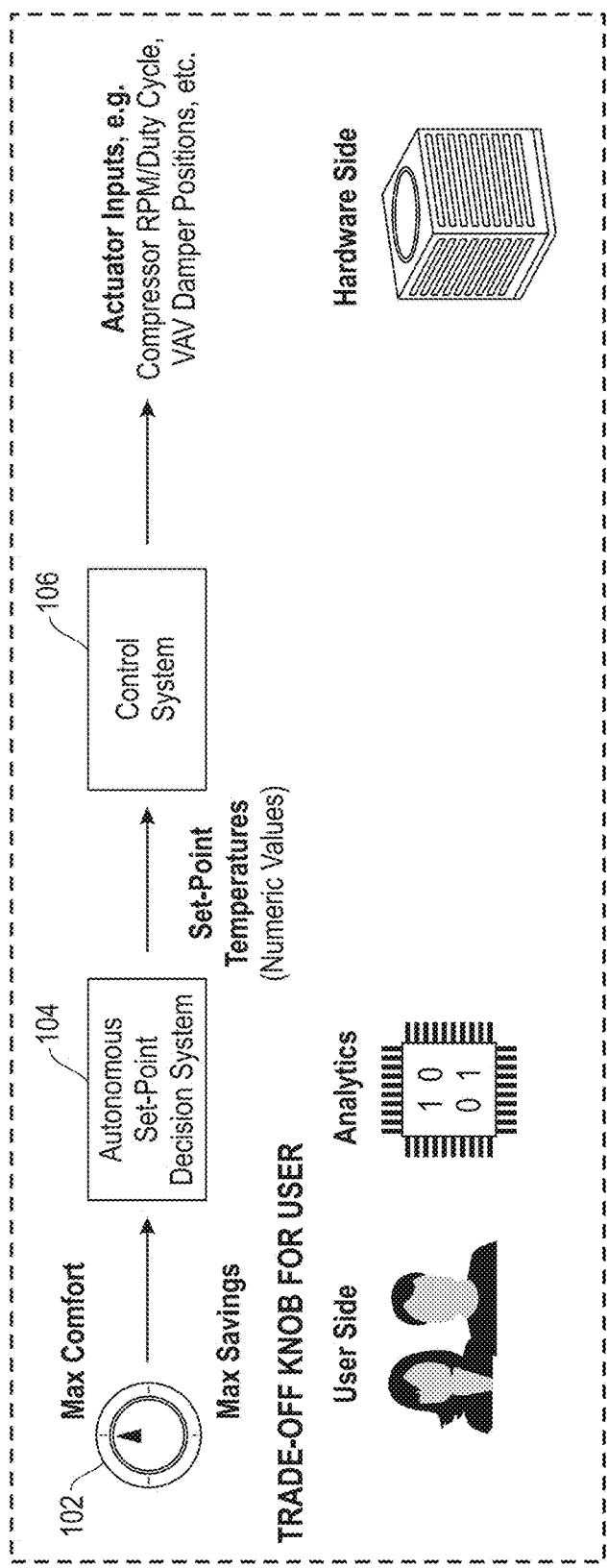
FIG. 1 is a diagram illustrating system architecture, according to an example embodiment of the invention.

FIG. 1 is a diagram illustrating system architecture, according to an embodiment of the invention. By way of illustration, FIG. 1 depicts intelligent thermal management system architecture which includes intelligent and autonomous determination of set-points, in real-time, to minimize HVAC (heating, ventilating, and air conditioning) energy consumption while ensuring occupant comfort. As illustrated in FIG. 1, user input (as provided, for example, by a building or facility manager in a commercial building) includes a selected setting. Such a setting can be selected via manipulation of a control knob 102 to identify a desired tradeoff between energy savings and thermal comfort.

As further depicted in FIG. 1, at least one embodiment of the invention includes capturing the above-noted user input and providing such user input to an autonomous set-point decision system 104, which implements one or more forms of analytics to determine and output one or more set-point temperatures (numeric values). These one or more set-point temperatures are provided as input to a control system 106, which provides inputs to hardware such as an actuator (wherein such input can include compressor revolutions per minute (RPM), duty cycles, variable air volume (VAV) damper positions, etc.).

As further detailed herein, at least one embodiment of the invention includes implementing rule-based analytics via the autonomous set-point decision system 104, wherein set-points are determined based on one or more pre-configured rules. Additionally, at least one embodiment of the invention includes implementing data-driven analytics via the autonomous set-point decision system 104, wherein set-points are determined based on data-driven adaptive and/or evolutionary modeling and predictive and/or proactive optimization. Data-driven adaptive and/or evolutionary modeling can include using data available through building management systems (BMS), occupancy sensors, etc. Such an embodiment further includes performing real-time and predictive and/or proactive optimization for set-point determination.

Accordingly, one or more embodiments of the invention includes explicitly accounting for the contribution of occupants (in a building) to a thermal load of the building, as well as performing a look-ahead optimization to minimize cost and/or energy, (proactively) accounting for temperature variations. In an example embodiment of the invention, set-point temperatures can be chosen to minimize peak demand, resulting in a reduced demand charge component of an electricity bill. Also, in one or more embodiments of the invention, set-points can be optimized within the constraint of a temperature range prescribed by building codes.

Figure 2:
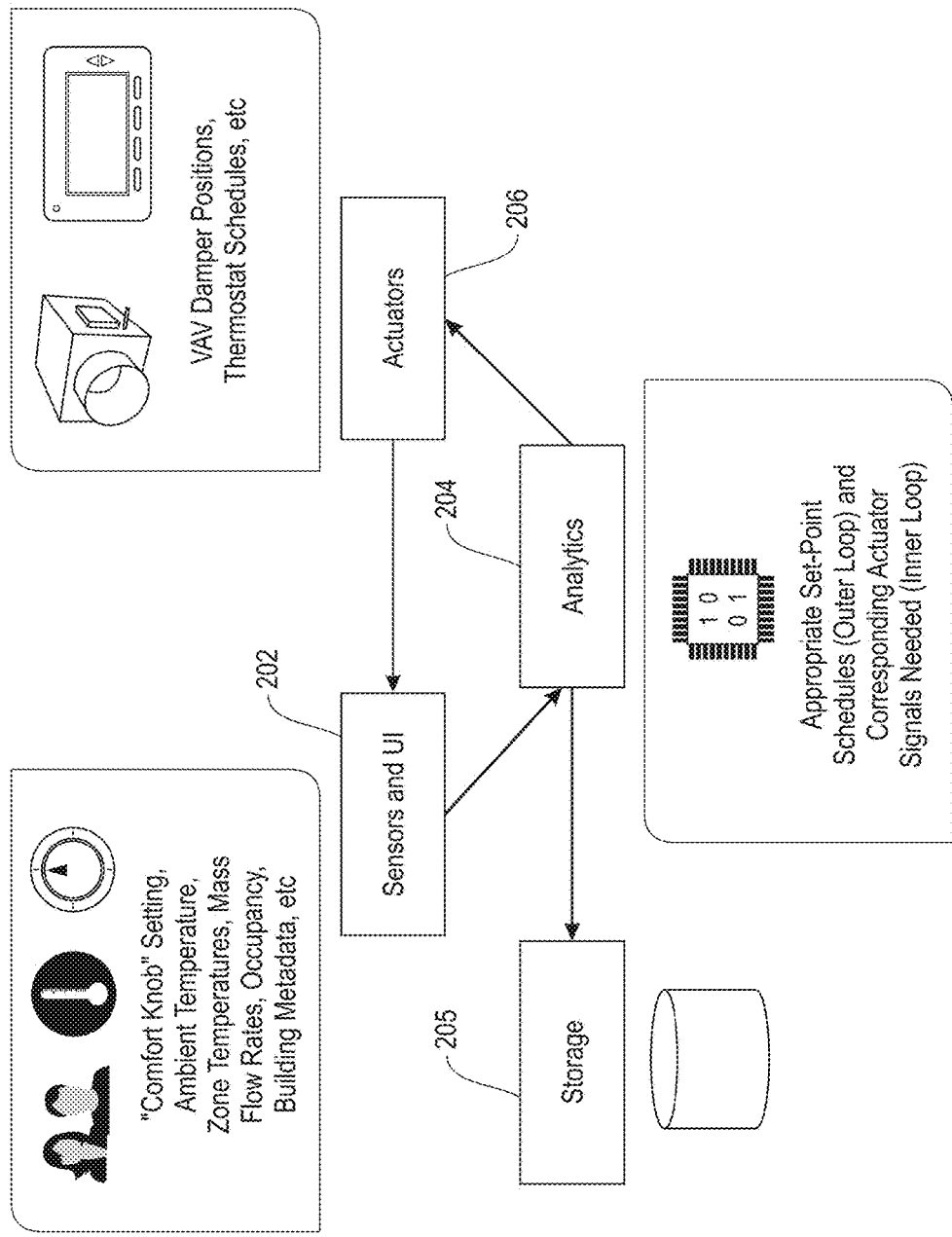
FIG. 2 is a diagram illustrating system architecture, according to an example embodiment of the invention.

FIG. 2 is a diagram illustrating system architecture, according to an embodiment of the invention. By way of illustration, FIG. 2 depicts a sensors and user interface (UI) component 202, which captures and provides input to an analytics component 204. The input captured by component 202 can include user-provided input via a comfort knob (as described herein), ambient temperature data, zone temperature data, conditioned air mass flow rates, occupancy building metadata, etc.

The analytics component 204, while interacting with a storage component 205, provides input to an actuator component 206. Information stored in the storage component 205 can include model parameters learnt from data, such as parameters for describing zone thermal dynamics. Such parameters can be updated over time in connection with an evolutionary modeling approach implemented in one or more embodiments of the invention. The input generated by the analytics component 204 (and provided to the actuator component 206) can include an appropriate set-point schedule (also referred to herein as an outer loop) and corresponding actuator signals needed therewith (also referred to herein as an inner loop).

As also depicted in FIG. 2, the actuator component 206 can provide input to the sensors and UI component 202. The input generated by the actuator component 206 (and provided to the sensors and UI component 202) can include VAV damper positions, thermostat schedules, etc. This information can be displayed in real-time to the building/facility manager (in a commercial setting) or to the end-consumer (in a residential setting).

Data-driven, adaptive/evolutionary modeling, as detailed herein, includes zone thermal modeling. In such an embodiment, zone temperature data, ambient temperature data, occupancy data, supply air temperature data, and set-point temperature data are input to a dynamic modeling engine along with meta-data such as control logic, and model coefficients are output from the engine. Additionally, for HVAC system modeling, supply air temperature data, return air/zone temperature data, and ambient temperature data are input to a static modeling engine along with meta-data such as tonnage, and model coefficients are output from the engine.

By way of example, sensor data including zone temperature data ($T_z$), ambient temperature data ($T_a$), occupancy data (CO2 density) ($\theta_{CO2}$), supply air temperature data ($T_s$), and zone set-point temperature data ($T_{z,SP}$) are input to a thermal modeling engine along with meta-data including a VAV control algorithm (for example, ON-OFF, proportional-integral-derivative (PID), etc.), and model coefficients ($k_a$, $k_{o,1}$, $k_{o,2}$, $k_c$, $C_z$, $\dot{m}_{s,o}$) are output from the engine.

As detailed herein, one or more embodiments of the invention implement zone energy balance, such as follows:

$$C_z \frac{dT_Z}{dt} = k_a(T_a(t) - T_z(t)) + k_{o,1}\theta_{CO2}(t) + k_{o,2} + \dot{Q}_{cooling}(t),$$

wherein $\dot{Q}_{cooling}(t) \sim \dot{m}_s(t)(T_s(t) - T_z(t))$, and wherein $\dot{m}_s(t) \sim \dot{m}_{s,o} + k_c(T_z(t) - T_{z,SP}(t))$, assuming proportional control is applied to the VAV box. Also, in the above-noted zone energy balance equation, $k_a(T_a(t) - T_z(t))$ represents heat gain from ambient, $k_{o,1}\theta_{CO2}(t) + k_{o,2}$ represents internal heat gain (from occupants), and $\dot{Q}_{cooling}(t)$ represents a zone cooling rate.

Intelligent set-point selection, in accordance with one or more embodiments of the invention, involves reacting to occupancy changes. By way of illustration, assume that a change in occupancy is detected at time $t_1$. At least one embodiment of the invention includes predicting the resulting temperature evolution trajectory at different values of set-point temperature.

As detailed herein, objectives of one or more embodiments of the invention include minimizing energy and/or cost for a look-ahead time window, and maximizing thermal comfort for occupants. By way of example, look-ahead constrained optimization in such an embodiment can be subject to constraints such as comfort constraints (based on building codes, for example), zone thermal dynamics (based on a model developed in connection with one or more embodiments of the invention), and/or additional constraints. Inputs for such an optimization can include current measurements (for example, zone temperature, ambient temperature, occupancy, etc.), a preferred temperature band (in case a user wants to bypass building codes, for instance), and a trade-off factor (for example, a value between 0 and 1) between comfort and energy savings (which can be input by the user). Outputs for such an optimization can include an optimal set-point schedule for the given look-ahead time window. The particular look-ahead window can be pre-decided (for example, within 24 hours) or altered by the user depending on one or more requirements.

Additionally, at least one embodiment of the invention can be implemented to capture and/or determine peak load minimization. Such an embodiment includes the use of a planning window, $T \in [0, T_h]$, to determine optimal set-point temperatures, $T_{z,SP}(t)$ for all $t \in T$, so as to minimize $\max_{t \in T} Q_{cooling}(t) := (\dot{m}_{s,o} + k_c(T_z(t) - T_{z,SP}(t)))$ $(T_z(t) - T_s(t))$ (peak load), subject to: $|\int_{t \in T} (Q_{cooling}(t) - Q_{cooling}^{baseline}(t))| < \eta_1 |\int_{t \in T} Q_{cooling}^{baseline}(t)|$ (bounded deviation in energy consumption from appropriate consumption baseline, $Q_{cooling}(t)$), $T_{comfort}^{min} \leq T_z(t_0) \leq T_{comfort}^{max}$ (guaranteed settling time of $t_0$), and $$C_z \frac{dT_z}{dt} = k_a(T_a(t) - T_z(t)) + k_{o,1} \theta_{CO2}(t) + k_{o,2} + \dot{Q}_{cooling}(t)$$

(zone thermal dynamics). Additionally, in at least one embodiment of the invention, one or more other constraints can be added or incorporated, as needed or desired.

Additionally, objectives of one or more embodiments of the invention include minimizing energy and/or cost for a look-ahead time window, and achieving a set-point temperature prescribed by an outer loop (as described herein). By way of example, look-ahead constrained optimization in such an embodiment can be subject to constraints such as a set-point constraint (that is, the deviation from the set-point prescribed by the outer loop should be within a given threshold), zone thermal dynamics (based on a model developed in connection with one or more embodiments of the invention), and/or additional constraints. Inputs for such an optimization can include current measurements (for example, zone temperature, ambient temperature, occupancy, etc.), and outputs for such an optimization can include a determined optimal control effort (for example, a compressor duty cycle in the case of a fixed drive, a compressor speed in the case of a variable drive, etc.).

Figure 3:
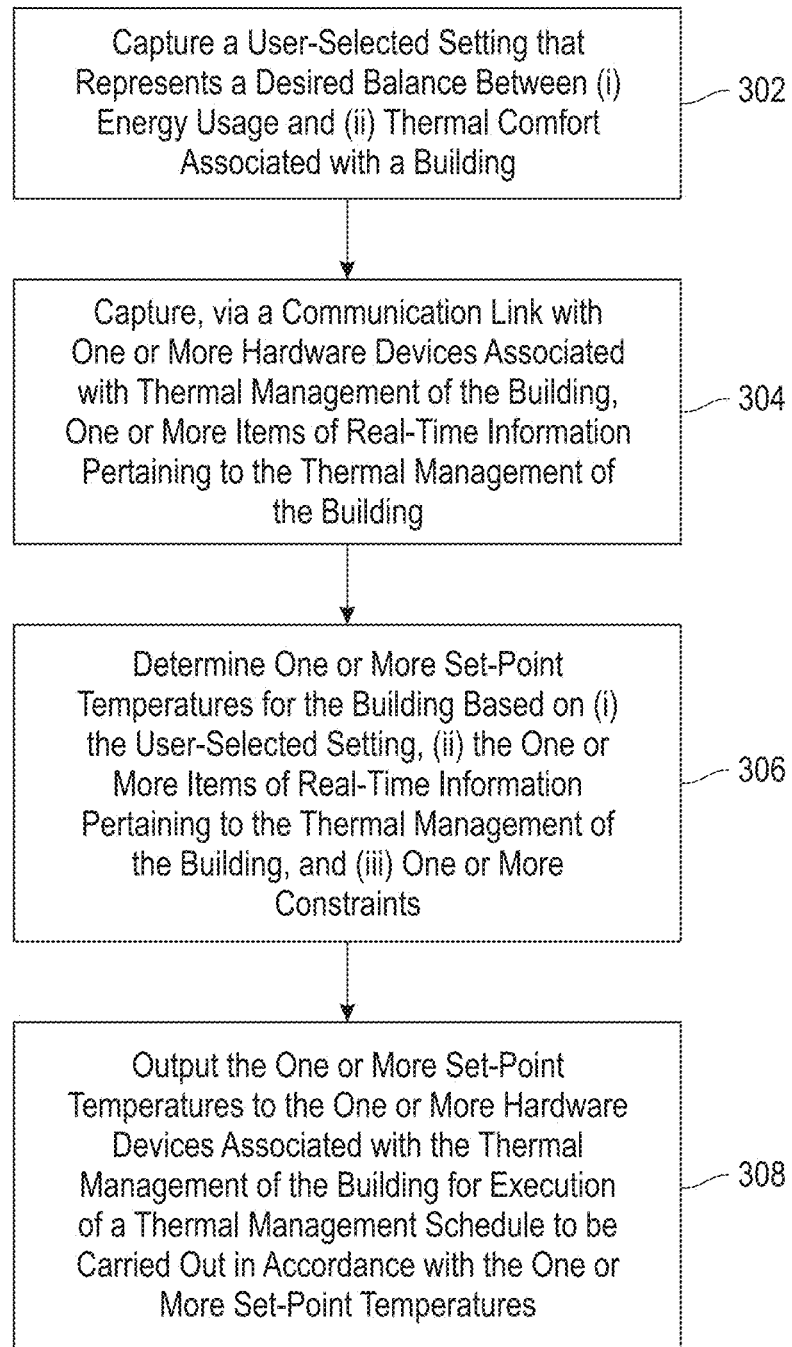
FIG. 3 is a flow diagram illustrating techniques according to an embodiment of the invention.

FIG. 3 is a flow diagram illustrating techniques according to an embodiment of the present invention. Step 302 includes capturing a user-selected setting that represents a desired balance between (i) energy usage and (ii) thermal comfort associated with a building. Additionally, at least one embodiment of the invention includes enabling the user to provide the user-selected setting by providing a configurable knob, wherein manipulation of the knob renders the user-selected setting.

Step 304 includes capturing, via a communication link with one or more hardware devices associated with thermal management of the building, one or more items of real-time information pertaining to the thermal management of the building. The one or more hardware devices associated with the thermal management of the building can include an actuator. In at least one embodiment of the invention, the items of real-time information can include compressor revolutions per minute data associated with the actuator, compressor duty cycle information associated with the actuator, and/or variable air volume damper position information associated with the actuator.

Step 306 includes determining one or more set-point temperatures for the building based on (i) the user-selected setting, (ii) the one or more items of real-time information pertaining to the thermal management of the building, and (iii) one or more constraints. The constraints can include one or more constraints pertaining to a building code. Additionally, the items of real-time information can include a contribution of occupancy to a thermal load of the building, real-time occupancy data associated with the building derived from one or more sensors (such as a carbon dioxide sensor, for example), and/or ambient temperature data associated with the building.

Step 308 includes outputting the one or more set-point temperatures to the one or more hardware devices associated with the thermal management of the building for execution of a thermal management schedule to be carried out in accordance with the one or more set-point temperatures.

The techniques depicted in FIG. 3 can also include determining one or more set-point temperatures for the building for a given future time period based on (i) the user-selected setting, (ii) the one or more items of real-time information pertaining to the thermal management of the building, (iii) one or more constraints, and (iv) one or more items of historical information pertaining to the thermal management of the building. Additionally, the one or more determined set-point temperatures can be stored in a storage component.

Also, at least one embodiment of the invention includes capturing a user-selected setting that represents a desired balance between (i) energy usage and (ii) thermal comfort associated with a building, and capturing, via a communication link with one or more hardware devices associated with thermal management of the building, one or more items of real-time information pertaining to the thermal management of the building comprising at least real-time occupancy data associated with the building. Such an embodiment also includes determining one or more set-point temperatures for the building based on (i) the user-selected setting, (ii) the one or more items of real-time information pertaining to the thermal management of the building, and (iii) one or more constraints, and outputting the one or more set-point temperatures to the one or more hardware devices associated with the thermal management of the building for execution of a thermal management schedule to be carried out in accordance with the one or more set-point temperatures. Additionally, such an embodiment includes detecting a change to the real-time occupancy data associated with the building, updating the one or more set-point temperatures for the building based on the detected change to the real-time occupancy data, and outputting the updated one or more set-point temperatures to the one or more hardware devices associated with the thermal management of the building for execution of a thermal management schedule to be carried out in accordance with the updated one or more set-point temperatures.

The techniques depicted in FIG. 3 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an aspect of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 3 can be implemented via a computer program product that can include computer useable program code that is stored in a computer readable storage medium in a data processing system, and wherein the computer useable program code was downloaded over a network from a remote data processing system. Also, in an aspect of the invention, the computer program product can include computer useable program code that is stored in a computer readable storage medium in a server data processing system, and wherein the computer useable program code is downloaded over a network to a remote data processing system for use in a computer readable storage medium with the remote system.

An aspect of the invention or elements thereof can be implemented in the form of an apparatus including a memory and at least one processor that is coupled to the memory and configured to perform exemplary method steps.

Figure 4:
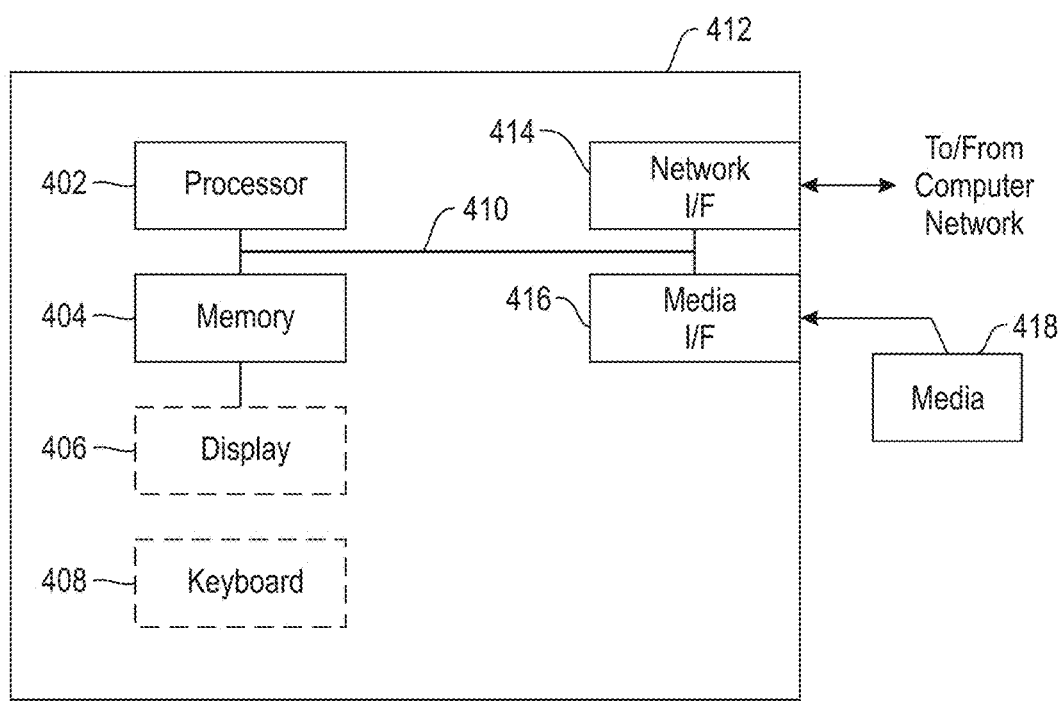
FIG. 4 is a system diagram of an exemplary computer system on which at least one embodiment of the invention can be implemented.

Additionally, an aspect of the present invention can make use of software running on a general purpose computer or workstation. With reference to FIG. 4, such an implementation might employ, for example, a processor 402, a memory 404, and an input/output interface formed, for example, by a display 406 and a keyboard 408. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 402, memory 404, and input/output interface such as display 406 and keyboard 408 can be interconnected, for example, via bus 410 as part of a data processing unit 412. Suitable interconnections, for example via bus 410, can also be provided to a network interface 414, such as a network card, which can be provided to interface with a computer network, and to a media interface 416, such as a diskette or CD-ROM drive, which can be provided to interface with media 418.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 402 coupled directly or indirectly to memory elements 404 through a system bus 410. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 408, displays 406, pointing devices, and the like) can be coupled to the system either directly (such as via bus 410) or through intervening I/O controllers (omitted for clarity).

Network adapters such as network interface 414 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 412 as shown in FIG. 4) running a server program. It will be understood that such a physical server may or may not include a display and keyboard.

As will be appreciated by one skilled in the art, aspects of the present invention may be embodied as a system, method and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, as noted herein, aspects of the present invention may take the form of a computer program product that may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 402. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed general purpose digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

The corresponding structures, materials, acts, and equivalents of all means or step plus function elements in the claims below are intended to include any structure, material, or act for performing the function in combination with other claimed elements as specifically claimed.

At least one aspect of the present invention may provide a beneficial effect such as, for example, providing intelligent and autonomous set-point temperature determinations to explicitly tradeoff energy and comfort while considering a building code.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:

capturing, from a user, a user-selected setting that represents a desired balance between energy usage and thermal comfort associated with a building;

capturing, via a communication link with one or more hardware devices associated with thermal management of the building, real-time information pertaining to the thermal management of the building including real-time occupancy information and ambient temperature;

receiving, from the user, a planning window indicating a duration of time in the future;

determining a cooling rate to limit peak cooling output of the hardware devices associated with thermal management of the building, the cooling rate based on a product of a first difference and a second difference, the first difference being based on a difference between an expected zone temperature and one or more set-point temperatures and the second difference being based on a difference between the expected zone temperature and an air supply temperature;

determining the one or more set-point temperatures for the building during the planning window, the determining of the one or more set-point temperatures being based on the user-selected setting and the real-time information-pertaining to the thermal management of the building, the one or more set-point temperatures being within a range of comfort temperatures for occupants of the building, the determining of the one or more set-point temperatures being constrained to maintain the expected zone temperature in the planning window and a minimum cooling rate during the planning window;

determining a thermal management schedule for the one or more hardware devices associated with the thermal management of the building with the one or more set-point temperatures during the planning window;

configuring the one or more hardware devices associated with the thermal management of the building with the determined thermal management schedule; and performing thermal management of the building based on the thermal management schedule in accordance with the one or more set-point temperatures to reduce the energy usage associated with the building while maintaining thermal comfort of the building.

2. The method of claim 1, comprising:
enabling the user to provide the user-selected setting.

3. The method of claim 2, wherein said enabling comprises providing a configurable knob, wherein manipulation of the knob renders the user-selected setting.

4. The method of claim 1, wherein the determining one or more set-point temperature for the building is further based on constraints pertaining to a building code.

5. The method of claim 1, wherein the real-time information comprise real-time occupancy information associated with the building derived from one or more sensors.

6. The method of claim 5, wherein the one or more sensors comprises a carbon dioxide sensor.

7. The method of claim 1, wherein the one or more hardware devices associated with the thermal management of the building comprises an actuator.

8. The method of claim 7, wherein the one or more items of real-time information comprise compressor revolutions per minute data associated with the actuator.

9. The method of claim 7, wherein the one or more items of real-time information comprises compressor duty cycle information associated with the actuator.

10. The method of claim 1, comprising:
storing the one or more determined set-point temperatures in a storage component.

11. The method of claim 1, wherein the planning window is based on one or more items of historical information pertaining to the thermal management of the building.

12. A computer program product, the computer program product comprising a computer readable storage medium having program instructions embodied therewith, the program instructions executable by a computing device to cause the computing device to:

capture, from a user, a user-selected setting that represents a desired balance between energy usage and thermal comfort associated with a building;

capture, via a communication link with one or more hardware devices associated with thermal management of the building, real-time information pertaining to the thermal management of the building including real-time occupancy information and ambient temperature;

receive, from the user, a planning window indicating a duration of time in the future;

determine a cooling rate to limit peak cooling output of the hardware devices associated with the thermal management of the building, the cooling rate based on a product of a first difference and a second difference, the first difference being based on a difference between an expected zone temperature and one or more set-point temperatures and the second difference being based on a difference between the expected zone temperature and an air supply temperature;

determine the one or more set-point temperatures for the building during the planning window, the determining of the one or more set-point temperatures being based on the user-selected setting and the real-time information pertaining to the thermal management of the building, the one or more set-point temperatures being within a range of comfort temperatures for occupants of the building, the determining the one or more set-point temperatures being constrained to maintain the expected zone temperature in the planning window and a minimum cooling rate during the planning window;

determine a thermal management schedule for the one or more hardware devices associated with the thermal management with the one or more set-point temperatures during the planning window;

configure the one or more hardware devices associated with the thermal management of the building with the determined thermal management schedule; and perform thermal management of the building based on the thermal management schedule in accordance with the one or more set-point temperatures to reduce the energy usage associated with the building while maintaining thermal comfort of the building.

13. The computer program product of claim 12, wherein the planning window is based on one or more items of historical information pertaining to the thermal management of the building.

14. A system comprising:
a memory; and
at least one processor coupled to the memory and configured for:
capturing, from a user, a user-selected setting that represents a desired balance between energy usage and thermal comfort associated with a building;
capturing, via a communication link with one or more hardware devices associated with thermal management of the building, real-time information pertaining to the thermal management of the building including real-time occupancy information and ambient temperature;

receiving, from the user, a planning window indicating a duration of time in the future;

determining a cooling rate to limit peak cooling output of the hardware devices associated with the thermal management of the building, the cooling rate based on a product of a first difference and a second difference, the first difference being based on a difference between the expected zone temperature and one or more set-point temperatures and the second difference being based on a difference between the expected zone temperature and an air supply temperature;

determining the one or more set-point temperatures for the building during the planning window, the determining of the one or more set-point temperatures being based on the user-selected setting and the one or more items of real-time information pertaining to the thermal management of the building, the one or more set-point temperatures being within a range of comfort temperatures for occupants of the building, the determining of the one or more set-point temperatures being constrained to maintain the expected zone temperature in the planning window and a minimum cooling rate during the planning window;

determining a thermal management schedule for the one or more hardware devices associated with the thermal management of the building with the one or more set-point temperatures during the planning window;

configuring the one or more hardware devices associated with the thermal management of the building with the determined thermal management scheduled; and performing thermal management of the building based on the thermal management schedule in accordance with the one or more set-point temperatures to reduce the energy usage associated with the building while maintaining thermal comfort of the building.

15. The system of claim 14, wherein the one or more hardware devices associated with the thermal management of the building comprises an actuator.

16. A method, comprising:

capturing, from a user, a user-selected setting that represents a desired balance between energy usage and thermal comfort associated with a building;

capturing, via a communication link with one or more hardware devices associated with thermal management of the building, real-time information pertaining to the thermal management of the building comprising at least real-time occupancy data associated with the building including real-time occupancy information and ambient temperature;

receiving, from the user, a planning window indicating a duration of time in the future;

determining a cooling rate to limit peak cooling output of the hardware devices associated with thermal management of the building, the cooling rate based on a product of a first difference and a second difference, the first difference being based on a difference between the expected zone temperature and one or more set-point temperatures and the second difference being based on a difference between the expected zone temperature and an air supply temperature;

determining the one or more set-point temperatures for the building during the planning window, the determining of the one or more set-point temperatures being based on the user-selected setting and the one or more items of real-time information pertaining to the thermal management of the building, the one or more set-point temperatures being within a range of comfort temperatures for occupants of the building, the determining of the one or more set-point temperatures being constrained to maintain the expected zone temperature in the planning window and a minimum cooling rate during the planning window;

determining a thermal management schedule for the one or more hardware devices associated with the thermal management of the building with the one or more set-point temperatures during the planning window;

configuring the one or more hardware devices associated with the thermal management of the building with the determined thermal management schedule;

performing thermal management of the building based on the thermal management schedule in accordance with the one or more set-point temperatures;

detecting a change to the real-time occupancy information associated with the building;

updating the one or more set-point temperatures for the building based on the detected change to the real-time occupancy information; and outputting the updated one or more set-point temperatures to the one or more hardware devices associated with the thermal management of the building for execution of the thermal management schedule to be carried out in accordance with the updated one or more set-point temperatures.

* * * * *